Dec. 24, 1957   J. E. LISBON   2,817,286
COOKING DEVICE
Filed Dec. 29, 1954   2 Sheets-Sheet 1

INVENTOR.
Julius E. Lisbon
BY ECKHOFF & SLICK, Attys.

A member of the firm

Dec. 24, 1957   J. E. LISBON   2,817,286
COOKING DEVICE
Filed Dec. 29, 1954   2 Sheets-Sheet 2

INVENTOR.
Julius E. Lisbon
BY ECKHOFF & SLICK, Attys.

A member of the firm.

United States Patent Office 2,817,286
Patented Dec. 24, 1957

2,817,286

COOKING DEVICE

Julius E. Lisbon, Oakland, Calif.

Application December 29, 1954, Serial No. 478,234

1 Claim. (Cl. 99—423)

This invention relates to a cooking device, particularly one intended for handling of small objects such as hors d'oeuvres and the like.

The device of the present invention provides a simple, economical heating device for subjecting small edible articles such as hors d'oeuvres to heat, whereby these can be toasted or cooked, depending upon the wish of the operator.

It is in general the broad object of the present invention to provide a simple and improved cooking device for small articles such as hors d'oeuvres.

Figure 1:
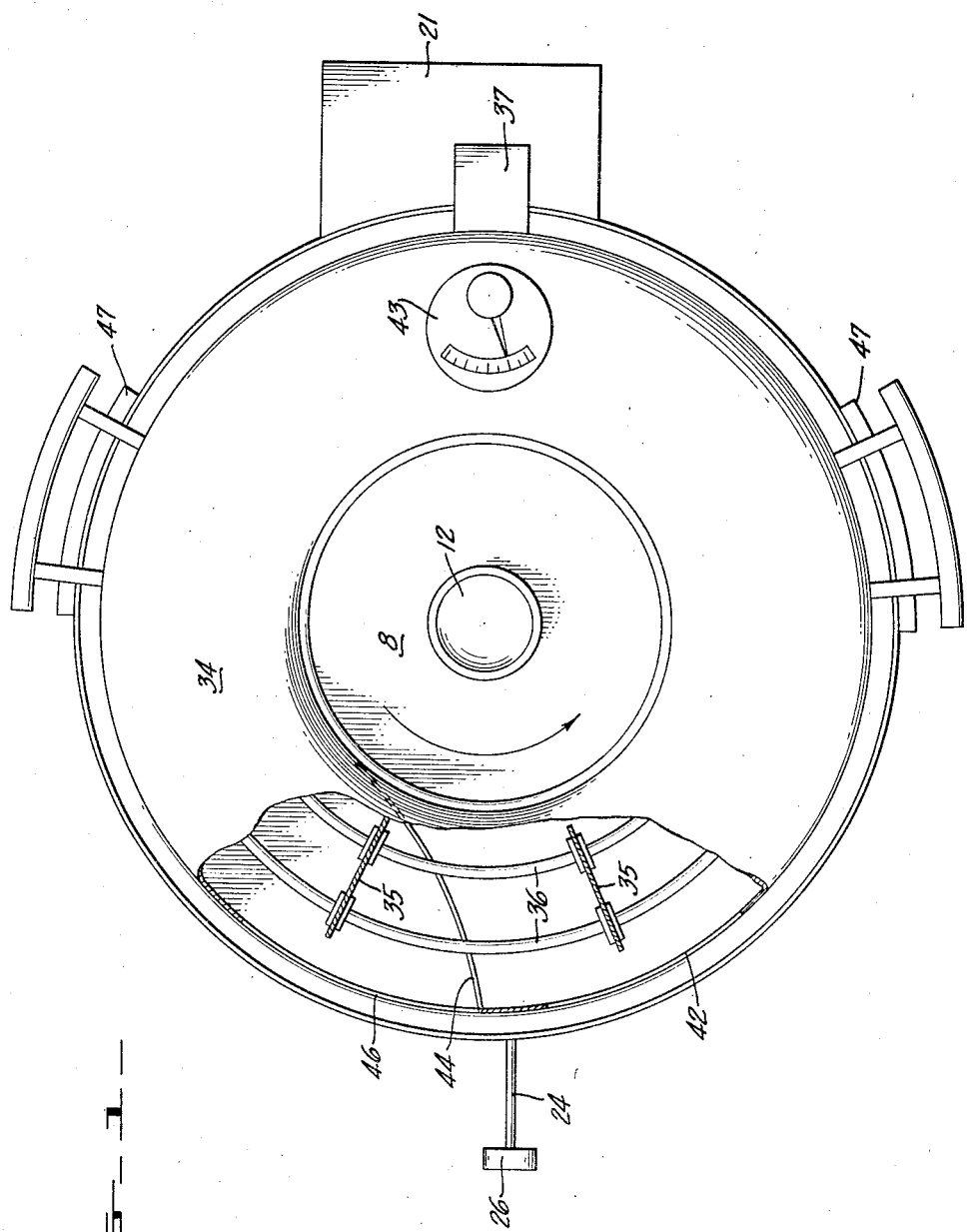

The invention includes other objects and features of advantage, some of which, together with the foregoing, will appear hereinafter wherein the present preferred form of hors d'oeuvre cooker is disclosed. In the drawing accompanying and forming a part hereof, Figure 1 is a plan view with a portion of the cover broken away to illustrate the interior construction.

Figure 2:
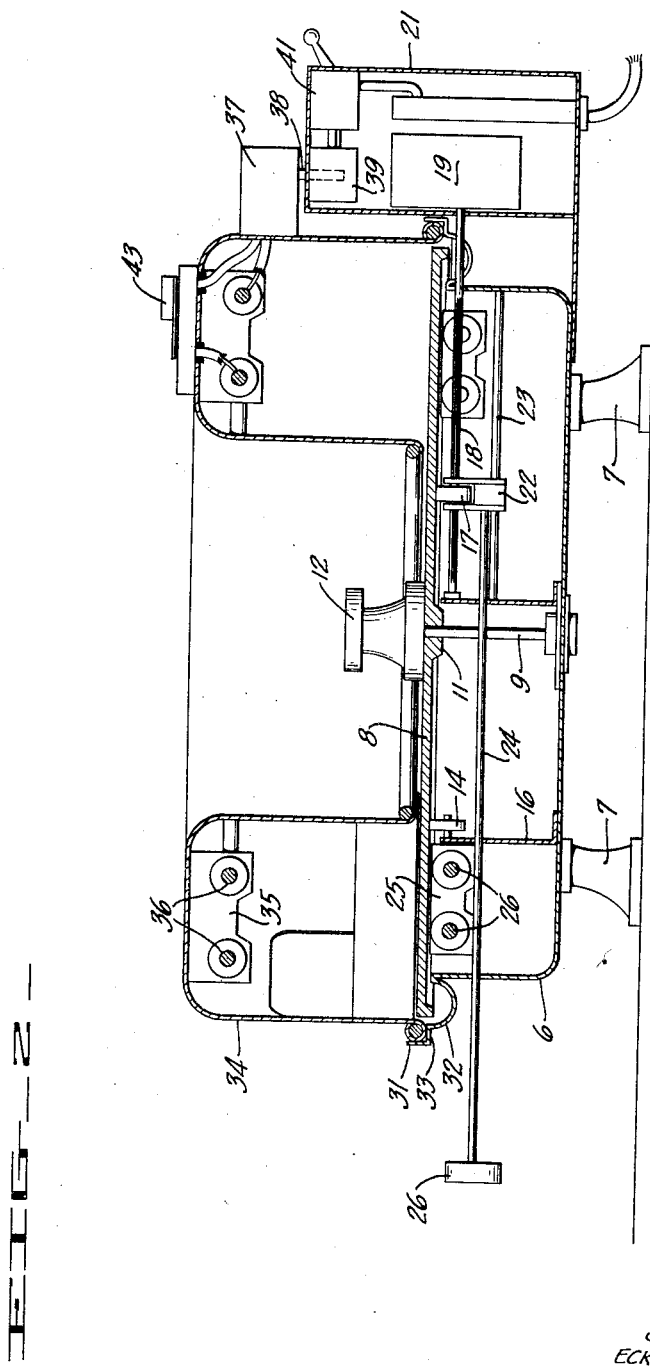

Figure 2 is a section taken through the device, illustrating further details of construction.

Referring to the drawing, the device includes a generally circular base 6 supported upon suitable legs 7. A revolving circular hot plate 8 is supported for rotation on the base, as will be described. Mounted centrally of the base 6 is an upstanding pin 9, the pin extending through an aperture in a boss 11 at the center of plate 8 and into a recess in handle 12, which is secured to the top of the plate so that it can be handled readily. The plate 8 is provided with an idler wheel 14 mounted upon a support 16 secured to the base 6. The plate is driven by drive wheel 17 slidably mounted upon a slotted drive shaft 18, which extends into the casing from a suitable drive mechanism, generally indicated at 19. The drive is mounted in a housing, generally indicated at 21, attached to a side of the base 6.

The drive wheel 17 is slidably mounted upon the drive shaft 18 and to this end a fork 22 is provided about the drive wheel, the fork being mounted upon shaft 18 and a rod 23 and secured to a slider rod 24, the latter extending through the housing and including a knob 26. By shifting the position of the drive wheel 17 in relation to the hot plate 8, one can readily change the speed of rotation of the plate to suit the speed of cooking desired.

Mounted adjacent the outer periphery of the circular base 6 are heating elements, generally indicated at 26, mounted in suitable supports 25, the heating elements being arranged in annular form on the underside of the heating plate.

The upper portion of base 6 terminates in a rim 31 having an annular drip ring 32 formed about the outer periphery thereof, the rim 31 including an outer shelf 33 providing a support for an annular cover 34 extended about the upper portion of the plate and providing an annular conduit through which articles are carried for cooking. In its upper portion the annular cover 34 includes spaced heating elements 36 mounted in suitable supports 35, the heating elements being connected to a bayonet plug connection 37 which includes blades 38 adapted to be attached or removed from electrical connection with a plug 39 built into the housing 21.

The operation of the motor 19 and the supply of current to the heating elements 26 and 34 is under the control of a switch mechanism, generally indicated at 41.

Articles to be subjected to heating are introduced through inlet 42 on one side of the casing, the articles being then carried by the revolving tray counter-clockwise, as appears in Figure 1, the supply of current to the several heating elements being under the control of the thermostat mechanism, generally indicated at 43. The articles continue in their travel until they reach the baffle 44 which causes them to slide out and issue through the outlet 46 as the plate travels past the baffle.

To provide for suitable handling of the device and its ready transport from one place to another, opposite handles 47 are provided upon the casing 6.

From the foregoing, I believe it will be apparent that I have provided a novel, simple and improved cooking device, one particularly suited to the preparation of small articles such as hors d'oeuvres and the like.

I claim:

A cooking device comprising: a rotatable cylindrical plate; a cover for the upper side of said plate, said cover being in the form of an annulus and having inlet and outlet openings; a baffle positioned within said cover separating the outlet from the inlet and for diverting an article from the plate and through the outlet; means for rotating said plate with respect to said cover comprising a drive wheel frictionally engaging the underside of said plate; a drive shaft for said drive wheel, said drive shaft supporting the drive wheel for sliding movement with respect to the plate; means for rotating the drive shaft; means for sliding the drive wheel radially of said plate to vary the rate of turning of the said plate by the drive wheel; a base for supporting said plate and the associated drive shaft and wheel, said base having an outer circular rim and an adjacent concentric trough, the periphery of said plate riding over said trough of said base, said annular cover being normally positioned over the plate and seated in the outer circular rim of said base; and resistance heating elements disposed above and below said plate to heat an article thereon, said lower heating elements being fixedly secured to said base, and said upper heating elements being fixedly mounted within said cover and detachably connected to a source of power.

References Cited in the file of this patent

UNITED STATES PATENTS

| | | |
|---|---|---|
| 1,524,532 | Biebel | Jan. 27, 1925 |
| 1,599,556 | Cook | Sept. 14, 1926 |
| 1,785,079 | Grapp | Dec. 16, 1930 |
| 2,156,860 | Lucas | May 2, 1939 |
| 2,190,465 | Adair | Feb. 13, 1940 |
| 2,305,604 | Campbell | Dec. 22, 1942 |
| 2,542,265 | Staples | Feb. 20, 1951 |
| 2,607,283 | Crank | Aug. 19, 1952 |
| 2,629,480 | Williams | Feb. 24, 1953 |
| 2,646,495 | Dornbush | July 21, 1953 |

FOREIGN PATENTS

| | | |
|---|---|---|
| 631,398 | Great Britain | Nov. 2, 1949 |